United States Patent [19]
Schunke

[11] Patent Number: 5,173,001
[45] Date of Patent: Dec. 22, 1992

[54] APPARATUS FOR CONNECTING TOGETHER A PAIR OF PROFILE BARS

[75] Inventor: Kurt Schunke, Minden, Fed. Rep. of Germany

[73] Assignee: Phoenix Mecano AG, Stein am Rhein, Fed. Rep. of Germany

[21] Appl. No.: 709,287

[22] Filed: Jun. 3, 1991

[30] Foreign Application Priority Data

Jun. 5, 1990 [DE] Fed. Rep. of Germany ... 9006344[U]

[51] Int. Cl.$^5$ .............................................. F16B 9/00
[52] U.S. Cl. ..................................... 403/252; 403/255; 403/262
[58] Field of Search ............... 403/252, 253, 254, 255, 403/192, 263, 262

[56] References Cited

U.S. PATENT DOCUMENTS

| | | | |
|---|---|---|---|
| 3,945,742 | 3/1976 | Condevaux | 403/192 X |
| 4,021,129 | 5/1977 | Sykes | 403/252 |
| 4,026,084 | 5/1977 | Goose | 403/255 X |
| 4,101,226 | 7/1978 | Parisien | 403/262 X |
| 4,778,487 | 10/1988 | Chenel | 403/255 X |
| 4,948,290 | 8/1990 | Janssen et al. | 403/255 |

FOREIGN PATENT DOCUMENTS 3604989 8/1987 Fed. Rep. of Germany.

*Primary Examiner*—Peter M. Cuomo
*Attorney, Agent, or Firm*—Laubscher, & Laubscher

[57] ABSTRACT

A connecting arrangement for connecting together a pair of orthogonally arranged profile bars a first one of which (1) is arranged with one of its ends adjacent the side of a second bar (2). A groove connecting member (4) is slidably retained in an undercut longitudinal groove (8) contained in the second profile bar, and an end connecting member (3) is slidably mounted in the groove intermediate the groove connecting member and the adjacent end of the first profile bar. First screws (6) fasten the end connecting member to the adjacent end of the first profile bar, and second screws (5) fasten the groove connecting member to the end connecting member, thereby to connect together the bars. Locator projections (11) on the end connecting member serve to properly position it relative to the first profile bar.

10 Claims, 1 Drawing Sheet

APPARATUS FOR CONNECTING TOGETHER A PAIR OF PROFILE BARS

STATEMENT OF THE INVENTION

Apparatus for connecting together a pair of profile bars that are orthogonally arranged with one end of a first bar adjacent one side of the second bar. A groove connecting member is slidably retained within an undercut longitudinal groove contained in one second of the bar, and an end connecting member is arranged in the groove between the groove connecting member and the end of the first bar. Locator means are provided on the end connecting member for properly positioning the same relative to the first profile bar. First screw means fasten the end connecting member with the end of the first profile bar, and second screw means fasten the groove connecting member to the end connecting member.

BACKGROUND OF THE INVENTION

BRIEF DESCRIPTION OF THE PRIOR ART

Releasable connections between a pair of profile bars or the like are well known in the prior art, as evidenced, for example, by the German Offenlegungsschrift No. 36 04 989. This known device has the drawback that it consists of a plurality of individual components that require an appreciable production effort, particularly the component that is attached to the vertical profile bar. Owing to the relatively extensive manufacturing steps required to produce the known connecting apparatus, the resulting cost of mass producing the apparatus is relatively great.

Moreover, in this known apparatus, the further drawback occurs in that, first of all, a self-tapping nut must be inserted into an interior chamber in one bar before the end flange member can be attached to the front face of the first profile bar. Another drawback is that the end flange member must be screwed concentrically together with the first profile bar, and consequently the bending forces to which the connection is subjected cannot be absorbed to the desired extent.

Accordingly, the present invention was developed to provide an improved inexpensive profile bar connecting apparatus that consists of only a few easily-produced parts which, following assembly, is highly resistant to stress.

SUMMARY OF THE INVENTION

Accordingly, a primary object of the present invention is to provide an improved apparatus for connecting together a pair of profile bars formed from a relatively soft metallic or non-metallic material, such as aluminum or a suitable synthetic plastic material, which bars are orthogonally arranged with one end of a first profile bar adjacent one side of a second profile bar. Each profile bar has a generally rectangular (preferably square) cross-sectional configuration with each side thereof containing a longitudinal undercut groove. A groove connecting member is slidably retained within the groove of the second profile member that is adjacent the end of the first profile member, and an end connecting member is arranged in this groove between the groove connecting member and the adjacent end of the first profile member. First screw means including a first pair of screws connect the end connecting member with the end of the first profile bar, and second screw means including a second pair of screws connect the groove connecting member with the end connecting member, thereby to rigidly fasten the profile bars together.

According to a more specific object of the invention, the end connecting member is provided with locator projecting means for properly positioning the end connecting member relative to the associated end of the first profile bar. In the preferred embodiment, a pair of locator means project within the ends of a pair of longitudinal grooves contained in the opposite sides of the first profile bar, respectively, and the second screw means include a pair of screws arranged in the said pair of longitudinal grooves which extend through bores contained in the locator projections for connection with the groove connecting member.

According to a further object of the invention, spring means are provided for biasing the groove connecting member away from the bottom wall of the groove toward the shoulders defined by the undercut groove, thereby to assist in retaining the groove connecting member in place during connection of the connecting means.

According to a modification of the invention, a pair of said groove connecting members may be provided in spaced relation in the groove for connection with the ends, respectively, of the end connecting member.

As a consequence of the present invention, it is now possible to make the end connecting member from a commercially available profile bar material, whereby the locator projections at the ends—which cause the exact positioning of the end connecting member—are so formed that, during the production of the end connecting member, the material of the cut-to-length semifinished product will be taken out between the two locator projections. This simple mechanical working process, together with the other required processing steps—i.e., excluding the insertion of passage boreholes—allows considerably more economical production.

By fastening the end connecting member by means of two side-by-side screws that are screwed within the interior chambers defined within the first profile bar—wherein commercially available self-tapping screws can be used —one can both simplify the assembly and also increase the resistance of the device to stress. The bending strength of the connection is increased considerably by means of the screws that are adjacent each other, spaced at an interval, and that are screwed into the first profile bar.

BRIEF DESCRIPTION OF THE DRAWINGS

Other objects and advantages of the invention will become apparent from a study of the following specification when viewed in the light of the accompanying drawing, in which:

FIG. 2c is a sectional view taken along line 2c—2c of FIG. 2a; and

FIG. 3 is a sectional view taken along line 3—3 of FIG. 2a.

DETAILED DESCRIPTION

Figure 3:
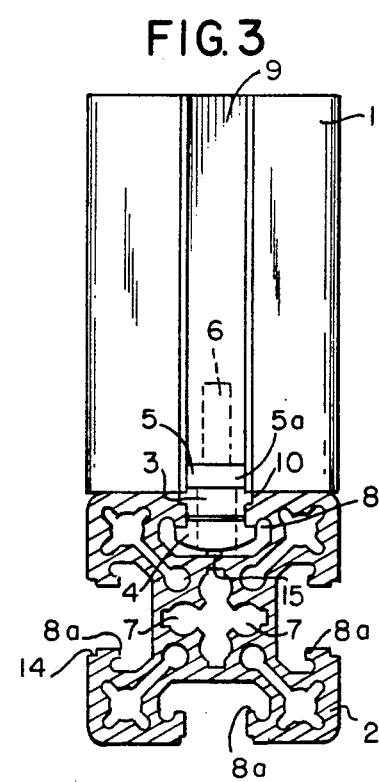

Referring now to the drawings, a first profile bar 1 is orthogonally arranged relative to a second profile bar 2, which profile bars are formed from a rigid relatively soft metallic or non-metallic material, such as aluminum, a suitable synthetic plastic material or the like. Each profile bar has a generally rectangular (preferably square) cross-sectional configuration, the longitudinal sides of the profile bar members 1 and 2 containing longitudinal undercut grooves 9 and 8, respectively. As shown in FIG. 3, the undercut grooves 8 in profile bar 2 define groove shoulder portions 8a, on each side of the groove. Similar groove shoulders are defined by the undercut grooves 9 in profile bar 1. The center portion of each profile bar contains four longitudinally extending chambers 7 that are arranged in a cross-shaped configuration, the chamber 7 being adjacent the bottom walls of the grooves, respectively.

Figure 2A:
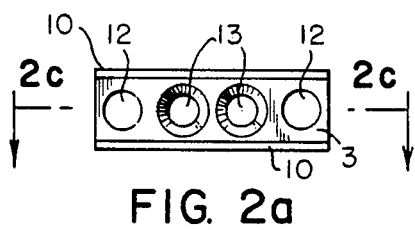
FIGS. 2a and 2b are side and end elevational views, respectively, of the end connecting member of FIG. 1.
Figure 2B:
Figure 2C:
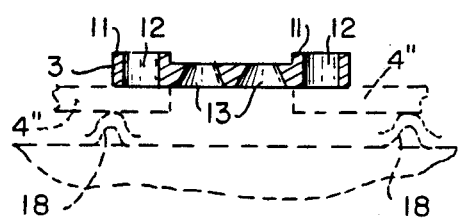

In accordance with the present invention, connector means are provided for connecting one end of the first profile bar 1 with the adjacent side of the orthogonally arranged second profile bar 2. To this end, a groove connecting member 4 is slidably retained within the undercut groove 8 opposite the first profile bar 1, the width of the groove connecting member 4 being greater than that of the groove, as shown in FIG. 3, whereby the groove connecting member is retained behind the undercut groove shoulders 8a. Also arranged in this groove between the groove connecting member and the associated end of the first profile bar 1 is an end connecting member 3, which is provided with a pair of locator projections 11 (FIG. 2c) that extend within corresponding ends of the longitudinal grooves 9 contained in the first profile bar 1, respectively. First screw means including a pair of first screws 6 are provided for fastening the end connecting member 3 with the end of the first profile bar 1. Thus, each first screw 6 has a tapered head portion 6a that is recessed within a corresponding frusto conical opening 13 contained in the end connecting member 3, as shown in FIG. 2c. The threaded end portions of the screw 6 are self-tapping screw threads which screw into the chambers 7 contained in the adjacent end of the first profile bar 1, respectively, the diameters of the chambers being slightly less than that of the screw threads. Second screw means including a pair of second screws 5 connect the groove connecting member 4 with the end connecting member 3, thereby to securely fasten the profile bar 1 with the profile bar 2. As shown in FIG. 3, the end connecting member 3 is provided with lateral flange portions 10 that extend within corresponding recesses 14 contained in the exterior surfaces of the shoulder portion 8a, whereby upon tightening of the second screw means 5, the groove member 4 and the end connecting member 3 are tightly clamped on opposite sides of the groove shoulder portions 8, there by to prevent lateral displacement of the connecting members 3 and 4 relative to the grooves 8 contained in the second profile bar 2. It will be noted that the cylindrical head portions 5a of the second screw means 5 are contained within the longitudinal grooves 9 contained in the first profile bar 1.

In accordance with another feature of the invention, a spring-loaded ball 15 is arranged in a corresponding recess contained within the groove connecting member 4, which spring-loaded ball is biased toward the bottom of the associated longitudinal groove 8, thereby to bias the groove connecting member away from the bottom wall of the groove toward the shoulder portions 8a. This affords the advantage that the groove connecting member 4 is retained in place relative to the second profile bar 2 during the assembly of the connecting means by means of the second screw means 5.

In accordance with a second embodiment of the invention illustrated in phantom in FIG. 2c, a pair of the groove connecting member 4' and 4" may be arranged in spaced relation within the groove for connection with opposite ends of the end connecting member 3, respectively. In this embodiment, leaf springs 18 are provided between the groove connecting members and the bottom walls of the associated groove, respectively.

Figure 1:
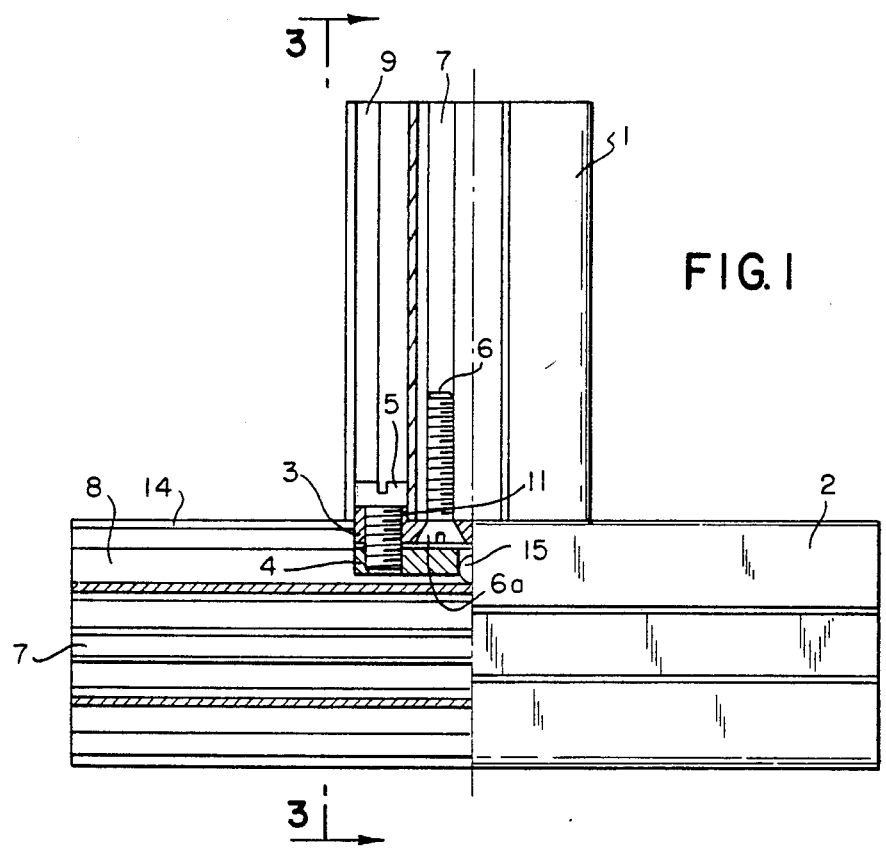
FIG. 1 is a partly broken away view illustrating the manner in which the connecting apparatus of the present invention connects one end of a first one of a pair of orthogonally arranged profile bars to the side of a second, bar.

In this embodiment, since the heads of the screws 6 are now concealed, it is possible to use, instead of the taper-headed screws 6 of FIG. 1, screws having a cylindrical head corresponding to the cylindrical head screws 5 of FIG. 1.

While, in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. Apparatus for releasably connecting together first and second profile bars (1,2) formed of a relatively soft rigid material, said bars each having a generally rectangular cross-sectional configuration defining four sides each containing a longitudinal groove (9,8) that is undercut to define a pair of groove shoulder portions, each of said grooves including a bottom wall spaced from said shoulder portions, said first bar (1) being arranged orthogonally relative to said second (2), said first bar having one end adjacent one side of said second bar, comprising:
    (a) at least one groove connecting member (4) slidably mounted in the undercut longitudinal groove contained in said second bar one side, the width of the groove opening between said shoulder portions of said one side longitudinal groove being less than the corresponding width dimension of said groove connecting member, whereby said groove connecting member is retained behind the shoulder portions of said one side longitudinal groove;
    (b) an end connecting member (3) arranged in said one side longitudinal groove intermediate said groove connecting member and said first bar, said end connecting member including locator projection means (11) that extend within the adjacent end of at least one of the grooves contained in said first bar, thereby to position said end connecting member relative to said first bar;
    (c) means fastening said end connecting member with said first bar, said fastening means consisting solely of a pair of first fastening screws (6); and
    (d) means including a pair of second screws (5) fastening said groove connecting member with said end connecting member, said first screws and said second screws being parallel and arranged orthogonally of, and in longitudinally spaced relation relative to, said end connecting member.

2. Apparatus as defined in claim 1, wherein said bars have center portions which contain longitudinal through chambers (7) for receiving said second screws, said second screws comprising self-tapping screws having diameters which are greater than the corresponding cross-sectional dimensions of said chambers respectively.

3. Apparatus as defined in claim 1, wherein said first screws having head portions that are countersunk within said end connecting member.

4. Apparatus as defined in claim 1, wherein said locator projection means have cross-sectional dimensions that correspond generally with the corresponding cross sectional dimensions of the associated grooves contained in said first profile bar, respectively.

5. Apparatus as defined in claim 4, wherein said second screws (5) are contained in the grooves of said first bar and extend through bores contained in said locator projection means (11) of said end connecting member.

6. Apparatus as defined in claim 1, wherein said second bar one side contains countersunk recesses (14) on opposite sides of said second bar groove, and further wherein said end connecting member includes lateral flange portions (10) that extend within said recesses, respectively.

7. Apparatus as defined in claim 1, wherein a pair of said groove connecting members are arranged in spaced relation within the groove contained in said second bar one side adjacent the end portions of said end connecting member, respectively, said groove connecting members being connected with the adjacent end portions of said end connecting member, respectively.

8. Apparatus as defined in claim 1, wherein each of said bars has a generally square cross-sectional configuration, and further wherein said end member locator means extend within the ends of the longitudinal grooves contained in said first profile bar.

9. Apparatus for releasably connecting together first and second profile bars (1,2) formed of relatively soft rigid material, said bars each having a generally rectangular cross-sectional configuration defining four sides each containing a longitudinal groove (9,8) that is undercut to define a groove bottom wall and a pair of groove shoulder portions spaced from said groove bottom wall, said first bar (1) being arranged orthogonally relative to, and having one end adjacent one side of, said second bar (2), comprising:

(a) at least one groove connecting member (4) slidably mounted in the undercut longitudinal groove contained in said second bar one side, the distance between said shoulder portions of said one side longitudinal groove being less than the corresponding width dimension of said groove connecting member, whereby said groove connecting member is retained behind the shoulder portions of said one side longitudinal groove, said groove connecting member containing a recess in which is mounted a spring-loaded ball (15) that biases said groove connecting member away from the groove bottom wall toward said shoulder portions;

(b) an end connecting member (3) arranged in said one side longitudinal groove intermediate said groove connecting member and said first bar, said end connecting member including locator projection means (11) that extend within the adjacent end of at least one of the grooves contained in said first bar, respectively, thereby to position said end connecting member relative to said first bar adjacent end;

(c) means including a pair of first screws (6) fastening said end connecting member with the end of said first bar; and (d) means including a pair of second screws (5) fastening said groove connecting member with said end connecting member, said first screws and said second screws being parallel and arranged in orthogonal relation relative to, and longitudinally spaced of, said end connecting member.

10. Apparatus for releasably connecting together first and second profile bars (1,2) formed of a relatively soft rigid material, said bars each having a generally rectangular cross-sectional configuration defining four sides each containing a longitudinal groove (9,8) that is undercut to define a pair of groove shoulder portions, each of said grooves including a bottom-wall spaced from said shoulder portions, said first bar (1) being arranged orthogonally relative to said second bar, said first bar having one end adjacent one side of said second bar, comprising:

(a) a pair of groove connecting member (4") slidably mounted in the undercut longitudinal groove contained in said second bar one side, the width of the groove operating between said shoulder portions of said one side longitudinal groove being less than the corresponding width dimensions of said groove connecting members, whereby said groove connecting members are retained behind the shoulder portions of said one side longitudinal groove.

(b) leaf spring means (18) arranged between said groove connecting members and the bottom wall of said one side longitudinal groove, said leaf springs being operable to bias said groove connecting members away from said groove bottom wall toward the associate groove shoulder portions;

(c) an end connecting member (3) arranged in said one side longitudinal groove intermediate said groove connecting member and said first bar, said end connecting member including locator projection means (11) that extend within the adjacent end of at least one of the grooves contained in said first bar, thereby to position said end connecting member relative to said first bar, said groove connecting members being longitudinally spaced in said one side longitudinal groove with the adjacent ends of said groove connecting members being adjacent the ends of said end connecting member, respectively;

(d) means fastening said end connecting member with said first bar, said fastening means including a pair of first fastening screws (6); and (e) means including a pair of second screws (5) fastening said groove connecting members with the ends of said end connecting members, respectively, said first screws and said second screws being parallel and arranged orthogonally of, and in longitudinally spaced relation relative to, said end connecting member.

* * * * *